Figure 1:
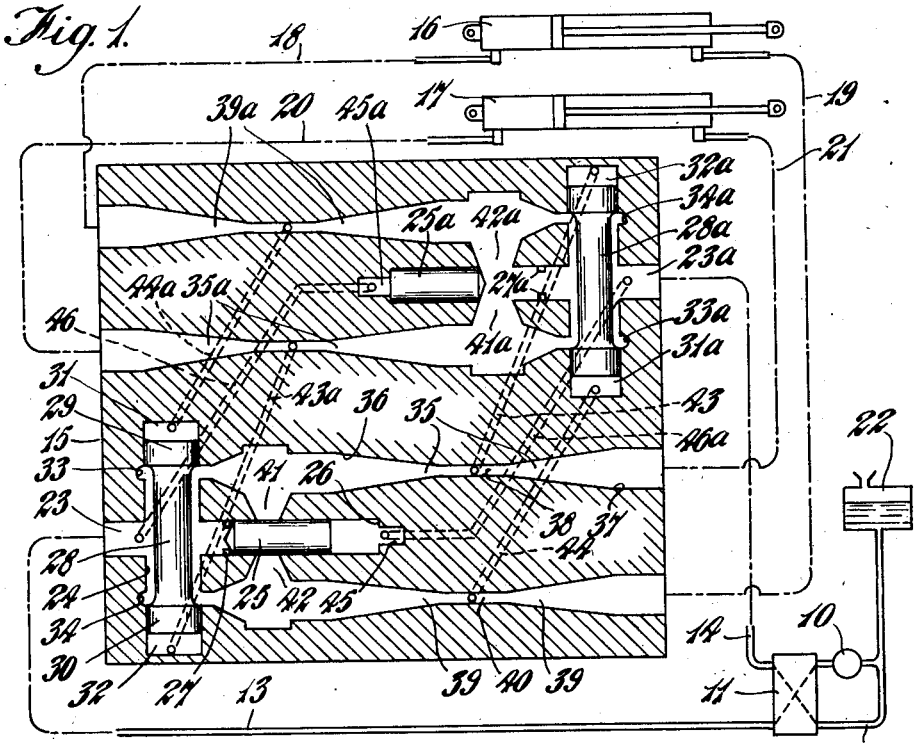

Sept. 17, 1940.   J. P. BEESTON   2,215,169

LIQUID PRESSURE REMOTE CONTROL SYSTEM

Filed May 24, 1938   3 Sheets-Sheet 1

INVENTOR
John Percival Beeston
BY
Maxwell E. Sparrow
ATTORNEY

INVENTOR
JOHN PERCIVAL BEESTON
ATTORNEY

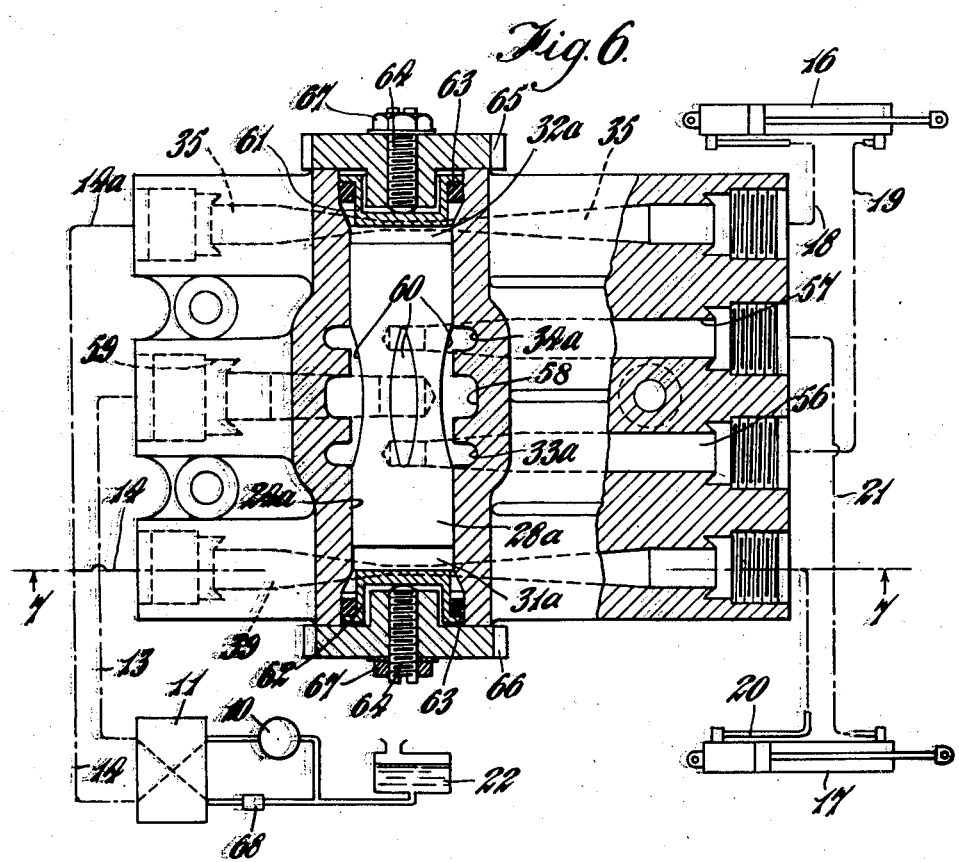
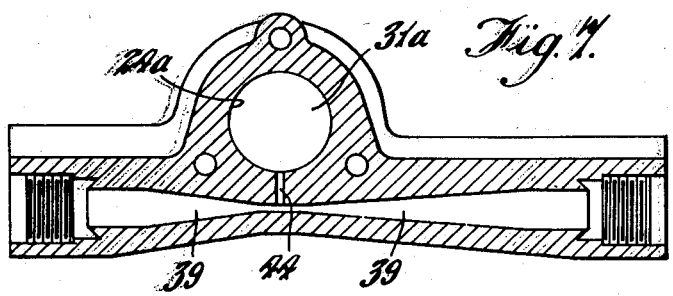

Patented Sept. 17, 1940

2,215,169

UNITED STATES PATENT OFFICE 2,215,169

LIQUID PRESSURE REMOTE CONTROL SYSTEM

John Percival Beeston, London, England, assignor to Automotive Products Company Limited, London, England Application May 24, 1938, Serial No. 209,734
In Great Britain May 26, 1937

6 Claims. (Cl. 60—97)

This invention relates to liquid pressure remote control systems in which the flow of liquid from a common source is required to be divided equally or in a predetermined ratio so as to pass from a plurality of separate passages for feeding corresponding pieces of apparatus and causing them to be actuated to equal extents despite variations or inequalities in the resistance to flow offered by said apparatus.

It is the primary object of the present invention to provide an improved form of equalizing valve device which is intended more particularly for use where a plurality of hydraulic jacks or equivalent are required to be actuated in unison from a common source of pressure liquid.

In a liquid pressure remote control system having a plurality of jacks which are required to work in unison from a common source of pressure liquid, the present invention is characterised by the provision of a flow equalising device comprising a plurality of Venturi-shaped passages through which the liquid streams corresponding to the respective jacks are caused to pass, and a valve device which is actuated by pressure changes caused by the Venturi-shaped passages so as to control the distribution of pressure liquid to the respective jacks, said valve device conveniently being actuated by fluid pressure means operatively connected with the "throat" portions of the Venturi-shaped passages.

There is also provided according to the invention a liquid pressure remote control system comprising a pair of double-acting jacks which are required to work in unison from a common source of pressure liquid, a Venturi-shaped passage inserted in the pressure pipe line leading to each jack, and a valve device which is operated by the liquid pressure fluctuations in the Venturi-shaped passages and retards the movement of one or the other jack by restricting the flow of return liquid therefrom.

The invention also consists in an equalising valve device for a liquid pressure remote control system and comprising in combination with a plurality of Venturi-shaped passages to be connected in the pipe lines of the respective jacks, a throttling valve which is responsive to pressure fluctuations in the Venturi-shaped passages and which is also connected in said pipe lines so as to restrict the flow of pressure liquid therethrough for controlling the operation of the jacks. Conveniently two pairs of Venturi-shaped passages may be provided, each pair being connected respectively with a corresponding flow-controlling valve device, which latter is interconnected with the other pair of Venturi-shaped passages so as to be actuated by fluctuations in the flow of liquid through said other pair of passages. This arrangement enables the equalising effect to be obtained during operation of the jacks or the like in both directions.

The invention is illustrated in the accompanying drawings in which

Figure 2:
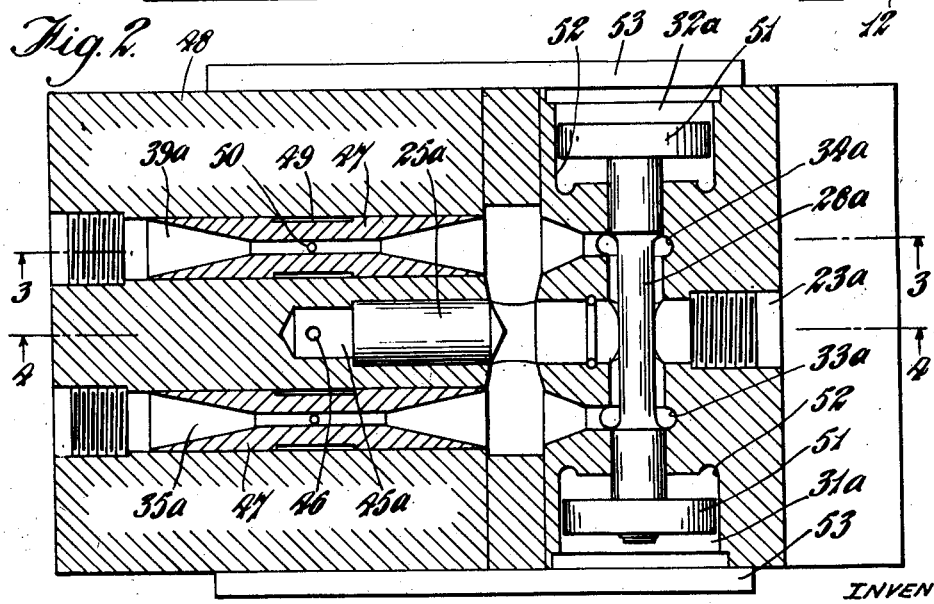
Figure 3:
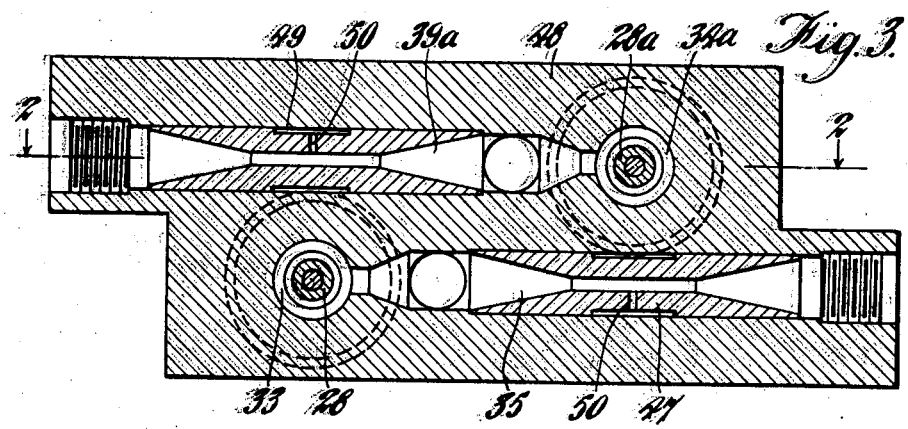
Figure 4:
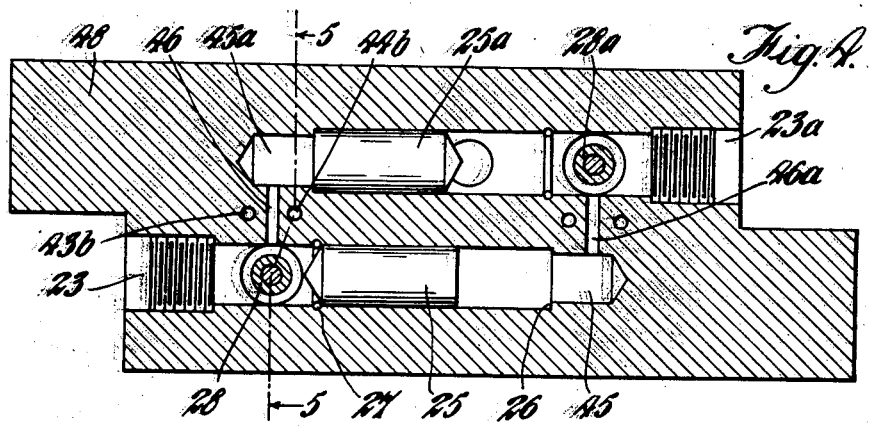
Figure 5:
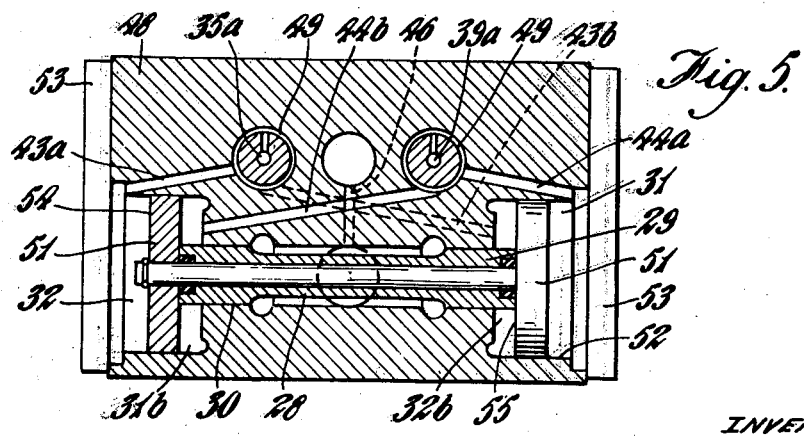

Figure 1 is a sectional diagram to show the connections between the parts in one form of hydraulic remote control system embodying an equalising valve;

Figures 2 to 5 are sectional views of one construction of valve arranged as in Figure 1, Figure 2 being a sectional plan on the line 2—2 of Figure 3, Figures 3 and 4 being sectional elevations on the lines 3—3 and 4—4 respectively of Figure 2, and Figure 5 being an end sectional elevation taken on the line 5—5 of Figure 4;

Figure 6 is a sectional plan of a simplified form of equalising valve device; and Figure 7 is a sectional elevation of the valve device taken on the line 7—7 of Figure 6.

The remote control system depicted as an example in Figure 1 comprises a pump 10 which is conveniently motor driven, such as by the engine of an aircraft, and is adapted to feed liquid under pressure to a selector valve 11 of the usual construction, said valve being adapted to return the liquid to the inlet of the pump 10 through a pipe 12, or to conduct it to either one of a pair of pipe lines 13 and 14, both of these being connected with an equalising valve device according to the invention and indicated generally at 15. A pair of double-acting jacks or the like shown diagrammatically at 16 and 17 respectively are connected by pipe lines 18, 19, and 20, 21 with the valve device 15. The arrangement is such that when the pressure liquid from the pump 10 passes to the pipe line 13, the liquid stream is divided between the pipe lines 19 and 21 and causes both of the jacks 16 and 17 to be shortened simultaneously, while the actuation of the selector valve 11 so as to connect the pressure liquid with the pipe line 14 similarly feeds said pressure liquid through the pipe lines 18 and 20 so as to cause both jacks 16 and 17 to extend. It will be appreciated that when pressure liquid is supplied to the pipe line 14, the liquid rejected by the jacks is returned through the pipe line 13 to the inlet connection 12 and vice versa, a reservoir 22 also being connected with the inlet pipe 12 so as to keep the system filled with liquid.

The pipe line 13 is connected with a passage 23 in the valve device 15, said passage 23 intersecting a valve bore 24 and being continued so as to accommodate slidably a by-pass valve piston 25 which is free to move between a shoulder 26 and a stop member 27. The bore 24 contains a slidable dumb-bell shaped valve member 28 having piston-like heads 29 and 30 which fit the bore 24 in a substantially fluid tight manner and which cause the valve member 28 to be responsive to any difference in the fluid pressures existing within chambers 31 and 32 at the ends of the bore 24. The bore 24 is formed with a pair of annular grooves 33 and 34 which are positioned so that when the valve member 28 is in its central position both grooves are just completely uncovered by the heads 29 and 30 of the valve member 28. Axial movement of the valve member 28 causes one or other of the grooves 33 and 34 to be partly closed. The annular groove 33 is connected with a passage 35 which is shaped in the manner of a Venturi water-meter and is herein referred to as a Venturi-shaped passage, the characteristic features of such passage being the provision of streamline converging and diverging parts 36 and 37 forming a throat 38 between them. Similarly the groove 34 communicates with a Venturi-shaped passage 39 having a throat portion 40, said passages 35 and 39 being connected respectively with the pipe lines 21 and 19 feeding the jacks 17 and 16. Adjacent the valve bore 24 the passages 35 and 39 are extended laterally as indicated at 41 and 42 so as to communicate with the passage 23 when the by-pass piston member 25 is retracted, although, of course, this connection is cut off when said member 25 is in the position shown in Figure 1.

In a similar way the pipe line 14 is connected by way of a passage 23a and valve member 28a with a pair of Venturi-shaped passages 35a and 39a leading respectively to the pipe lines 20 and 18 of the jacks. The construction of these and the associated parts is the same as that just described, and in Figure 1 the same reference numerals are employed using in addition the suffix a.

In order to control the working of the valve members 25, 28, 25a and 28a the passages at the lower part of the valve device 15 in Figure 1 are interconnected with the passages in the upper part thereof as follows. From the throat 38 of the passage 35 a connection 43 leads to the chamber 32a, and similarly a connection 44 joins the throat 40 of the Venturi-shaped passage 39 with the chamber 31a. Also, the passage 23 communicates with a space 45a behind the valve piston 25a by way of a connection 46. Corresponding connections 43a and 44a feed liquid to the chambers 32 and 31 from the passages 35a and 39a, while a connection 46a communicates with a space 45 and brings about the operation of the by-pass valve piston 25.

It is well known that when a stream of liquid under pressure flows through a passageway having a constricted throat portion, such for example as the Venturi-shaped passages 35, 39, 35a and 39a in Figure 1, the pressure of the liquid at the throat portion is considerably reduced owing to the high velocity of the liquid, and this effect is utilised to operate the valve members 28 and 28a in such a manner as to equalise substantially the rate at which the pressure liquid flows through the pipe lines 19 and 21 or 18 and 20 irrespective of the fact that the pressure in one of the pipe lines may be greater than that in the other owing to there being a greater load on one jack. Assuming that the selector valve 11 is operated to conduct the pressure liquid through the pipe line 14, it will be seen that this liquid flows freely past the middle part of the valve member 28a and thence is divided into two streams which flow through the Venturi-shaped passages 35a and 39a respectively, thus reaching the left hand sides of the jacks 17 and 16 respectively. At the same time the reduced pressure at the throat of the passage 39a is transmitted by the connection 44a to the chamber 31 of the valve member 28, and similarly the reduced pressure at the throat of the passage 35a is placed in communication with the chamber 32. If, therefore, the rates at which the liquid flows through the passages 35a and 39a tend to become unequal the reductions in the pressures at the throats will vary correspondingly, and as a consequence the valve member 28 will be moved out of its central position as it will have a greater fluid pressure at one end than the other. It will be noted that the extension of the jacks 16 and 17 caused by the pressure liquid supplied through the pipe lines 18 and 20 brings about the expulsion of liquid from the jacks through pipe lines 19 and 21, and that the jacks can only be extended so long as this liquid is free to escape. It is the function of the valve 28 to regulate the rate at which the liquid can so escape through the pipe lines 19 and 21, and in this way the action of the jacks 16 and 17 is controlled. Further, the pressure of liquid in the prevailing supply pipe line 14 is communicated by way of connection 46a to the space 45 behind the piston valve member 25, thus causing it to isolate the passages 41 and 42 from the passage 23 and compelling the liquid from the Venturi-shaped passages 35 and 39 to pass into the annular grooves 33 and 34 before it can reach the prevailing return pipe line 13. Supposing therefore that the jack 17 is rather stiff or has a heavier load to bear than the jack 16, there will naturally be a tendency for a greater quantity of liquid to flow through the Venturi-shaped passage 39a' than through the passage 35a. This brings about a greater reduction in the pressure within the chamber 31 than in the chamber 32 and consequently causes the valve member 28 to slide into a position where it partially closes the annular groove 34, thus throttling the return of the rejected liquid from the jack 16 through the pipe line 19. This, of course, retards the movement of the jack 16, and by suitably proportioning the parts a substantially equal rate of movement can be obtained with a relatively large difference in the loading of the jacks 16 and 17. Differences may perhaps exist in the rates at which return liquid flows through the Venturi-shaped passages 35 and 39 thus tending to change the position of the valve member 28a, but this will not affect the supply of pressure liquid as the by-pass piston valve 25a is forced to its fully open position due to the superiority of the pressure liquid in the passage 23a relative to the pressure of the return liquid in the passage 23. When the jacks 16 and 17 are operated in the reverse direction by supplying pressure liquid through the pipe line 13 exactly the same result is achieved, since the by-pass valve piston 25 is then caused to open and the valve member 28a regulates the flow of the return liquid under the influence of the reduced pressures existing at the throats of the Venturi-shaped passages 35 and 39.

Constructional details of an equalising valve device arranged substantially in accordance with the following description are shown in Figures 2 to 5. The Venturi-shaped passages 35a and 39a are constituted by sleeves 47 disposed in the upper part of a valve body indicated at 48, said sleeves each having a small radial hole 50 which extends from its throat portion and communicates with an annular chamber 49 formed by a circumferential groove in the exterior of the sleeve 47. The Venturi-shaped passages 35 and 39 are arranged similarly in the lower part of the body 48 as will be clear from Figure 3. To make the valve members 28 and 28a more sensitive and light in operation the two ends of each are provided with relatively large flat piston members 51, which are freely slidable each within a cylinder space indicated at 52 and closed by a cover plate 53. The purpose of these piston members 51 is to enlarge the area which is subject to the reduced liquid pressure at the throat portions of the Venturi-shaped passages, and the arrangement of the connection will be clear from Figure 5. The connections 43a and 44a are drilled as shown so as to place the throat portions of the passages 35a and 39a in communication with the chambers 32 and 31 respectively and in addition chambers 31b and 32b on the opposite sides of the piston members 51 are joined to the Venturi-shaped passages by connections indicated at 44b and 43b, respectively. These passages 43b and 44b do not, of course, intersect but pass one to each side of the connection 46 as will be seen in Figure 4. The connections between the valve member 28a and the throat portions of the Venturi-shaped passages 35 and 39 are arranged similarly at the opposite end of the body 48. It will be seen that the reduced pressure existing at the throat portions of the Venturi-shaped passages when the device is in operation is transmitted to a large area on the valve members; for instance the reduced pressure at the throat portion of the Venturi-shaped passage 35a acts upon the whole of the outer surface 54 of the piston member 51 attached to the end part 30 of the valve member 28 and simultaneously acts upon the annular surface 55 of the piston member 51 at the opposite end of said valve member 28, thus rendering the latter very sensitive to differences in the rates of flow of the liquid through the passages 35a and 39a. The piston members 51 need not be a liquid tight fit within the corresponding cylinder spaces 52, as in operation there is relatively little pressure difference between the two sides of each piston member 51 when once the valve member has assumed a position of equilibrium.

The simplified, but less satisfactory form of equalising valve device shown in Figures 6 and 7, employs only one pair of Venturi-shaped passages, these being indicated at 35 and 39. Both are connected by pipe lines 14 and 14a with a selector valve 11 as before, this being associated with a pump 10 and reservoir 22. At their other ends the Venturi-shaped passages 35 and 39 are connected respectively with pipe lines 18 and 20 which are used to feed pressure liquid to jacks 16 and 17 in order to bring about their extending movement. As before, the liquid rejected by the jacks during this movement passes through pipe lines 19 and 21 and is fed through passages 56 and 57 respectively which terminate in annular grooves 33a and 34a formed in a valve bore 24a. A central annular groove 58 also formed in this bore communicates by a passage 59 with the pipe line 13 leading back to the selector valve 11. In this example the piston valve member 28a is formed with a plurality of lenticular-shaped grooves 60 which, when the valve member 28a is centrally disposed, connect the two passages 56 and 57 with the pipe line 13. The two ends of the bore 24a are closed by caps 61 and 62 which are fitted with packing washers 63 and are adjustably held in place by set screws 64 passing through covers 65 and 66, locking nuts 67 being provided. This leaves chambers 31a and 32a which are connected respectively with the throat portions of the Venturi-shaped passages 39 and 35 respectively by passages, such as those indicated at 44 in Figure 7.

The device operates in a manner similar to the previous example when the selector valve 11 is set so as to deliver pressure liquid through the pipe line 14 (and 14a) in order to extend the jacks 16 and 17, the flow of liquid through the Venturi-shaped passages 35 and 39 causing reductions in pressure at their throat portions depending upon the rates at which the liquid is flowing through the passages 35 and 39. If these rates are unequal the valve member 28a is urged towards one end or the other of the bore 24a and thus has the effect of throttling the return of liquid from the jack which tends to move faster than the other. The equalising valve is found to be most effective when the system is working under load as this enables a relatively large reduction in pressure to be produced in the Venturi-shaped passages. If desired, a constriction indicated at 68 may be introduced into the return pipe line to raise the pressure in the system. When the selector valve 11 is operated to shorten the jacks by delivering pressure liquid through the pipe line 13, the valve member 28a is actuated by any difference in the flow of the rejected liquid through the Venturi-shaped passages 35 and 39 and has the effect of throttling the pressure liquid which is being delivered to the jacks through the passages 56 and 57. It is found, however, that the valve device is relatively insensitive when the jacks are operated in this direction.

In all cases it is desirable that the valve which effects the throttling and regulates the distribution of liquid through the jacks or equivalent units shall be incapable of completely shutting off either system. It will be appreciated moreover that Venturi-shaped passages may be employed in ways other than those described in order to control a valve automatically for the purpose of regulating the distribution of liquid through a plurality of systems fed from a common source. By the term "Venturi-shaped passage" is of course meant a passage which diminishes in cross-section to form a throat portion and then is enlarged again in a substantially stream-line form so as to incur only a relatively small frictional loss, and in which a connection is taken from the passage adjacent the throat thereof for the purpose of controlling a valve device responsive to the reduced pressure at the throat. In some cases, such for instance as where units of different sizes are to be operated in unison, the flow equalising valve may be arranged to distribute the pressure liquid so that the rates of flow in the respective branches are not equal but bear a predetermined constant ratio one to another, suitable for bringing about the operation of the units in unison.

The improved equalising valve and remote control system utilising the principle of the Venturi passage may be employed in many ways other than that described, and, if desired, provision can be made for equalising the flow in more than two separate circuits, as for instance by having a Venturi passage in each circuit and an individual valve member for each pair of circuits. Moreover, it will be appreciated that the use of Venturi passages as the actuating means for the regulating device enables a considerable pressure drop to be obtained without having to accommodate an equal pressure drop in the delivery. This enables the equalising valve to be placed in a high pressure portion of the system, and at the same time work in a sensitive manner on account of the relatively great pressure drop which the Venturi passage is capable of producing. The improved equalising valve described may, of course, be used for applications apart from hydraulic remote control systems.

What I claim is:

1. A double-acting remote control system comprising a reservoir, a source of pressure liquid, a selector valve fed with pressure liquid from said source and connected with said reservoir, a pair of main pipe lines connected with said selector valve, said valve selectively feeding one of said main pipe lines with pressure liquid and connecting the other of said main pipe lines to said reservoir, a distributing valve in each main pipe line, double-acting jacks, branch pipe lines between each distributing valve and corresponding ends of said jacks, the said distributing valve acting to restrict variably the liquid flow through one or other of the branch pipe lines, a Venturi-shaped passage including a throat portion provided in each of said branch pipe lines, means for actuating each distributing valve by fluid pressure, and connections from said actuating means of each distributing valve to said throat portions associated with the other distributing valve.

2. A double-acting remote control system comprising a reservoir, a source of pressure liquid, a selector valve fed with pressure liquid from said source and connected with said reservoir, a pair of main pipe lines connected with said selector valve, said valve selectively feeding one of said main pipe lines with pressure liquid and connecting the other of said main pipe lines to said reservoir, a distributing valve in each of said main pipe lines, a pair of double-acting jacks, a pair of branch pipe lines from each distributing valve leading to corresponding ends of said jacks, the said distributing valve acting to restrict variably the liquid flow through one or other of the branch pipe lines, a Venturi-shaped passage having a throat portion provided in each branch pipe line, means for actuating each distributing valve by fluid pressure, connections from said actuating means of each of said distributing valves to the throat portions of the Venturi-shaped passages joined with the other distributing valve, and a bypass valve device for each of said distributing valves arranged when open to by-pass its distributing valve, each by-pass valve being arranged to be opened by the fluid pressure in its own main pipe line and to be closed by the fluid pressure in the other main pipe line whereby the distributing valve in the pipe line which feeds pressure liquid is rendered inoperative while the distributing valve in the other main pipe line carrying the return liquid to said reservoir is rendered operative.

3. A remote control system according to claim 1, in which each distributing valve comprises a body, a bore in the body closed at both ends, a plunger slidable axially in the bore and having a head at each end fitting in said bore, a connection to one of said main pipe lines at the middle part of said bore, a pair of passages connected respectively with said branch pipe lines and leading into said bore at positions adjacent said plunger heads so that endwise movement of said plunger restricts one or the other of said branch pipe lines, the ends of said bore froming chambers connected with said throat portions of those Venturi-shaped passages connected in said branch pipe lines of said other of said main pipe lines.

4. A remote control system according to claim 1, in which each distributing valve comprises a body, a bore in said body and having a central portion and enlarged chambers at its ends, a piston axially slidable in said bore for restricting one or the other of said branch pipe lines, said piston being provided with an enlarged head at each end thereof, each head being slidable respectively in said chambers, dividing the latter into two compartments, inner and outer, respectively, and connections joining each outer compartment with the inner compartment at the opposite end of said bore so that each of said valves is rendered sensitive to variations in the ratio of the pressures at said throat portions of the Venturi-shaped passages by which each valve is actuated.

5. A remote control system according to claim 2, in which each by-pass valve comprises a bore, a plunger member slidable in said bore so as to provide at one end thereof a fluid space connected with said main pipe line of said other distributing valve, the other end of said member closing off adjacent Venturi-shaped passages from direct connection with the other main pipe line.

6. In a remote control system including a source of pressure liquid, a reservoir, and a pair of double-acting jacks: a flow equalizing valve device for securing simultaneous and equal operation of said jacks when fed from said source, a pair of main pipe lines connecting said device with said source and with said reservoir respectively, and two pairs of branch pipe lines connecting said device with said jacks, said equalizing valve device comprising a body, a pair of distributing valve connected respectively with the main pipe lines, two pairs of Venturi-shaped passages including throat portions formed in said body, each pair being connected at one end with the corresponding distributing valve and at the other end with the branch pipe lines leading to correspodng ends of said jacks, whereby each distributing valve is arranged to restrict variably the flow of liquid through one or other of the pair of Venturi-shaped passages with which it is connected, and two fluid pressure means for operating the distributing valves respectively, each of said fluid pressure means being connected with the throat portions of that pair of Venturi-shaped passages associated with the other distributing valve so as to be operated by variations in the differential pressure between said two throat portions.

JOHN PERCIVAL BEESTON.